United States Patent [19]
Ozden et al.

[11] Patent Number: 6,079,028
[45] Date of Patent: Jun. 20, 2000

[54] FAULT TOLERANT ARCHITECTURES FOR CONTINUOUS MEDIA SERVERS

[75] Inventors: Banu Ozden; Rajeev Rastogi, both of Union, N.J.; Prashant J. Shenoy, Austin, Tex.; Abraham Silberschatz, Union, N.J.

[73] Assignee: Lucent Technologies Inc., Murray Hill, N.J.

[21] Appl. No.: 08/839,188

[22] Filed: Apr. 23, 1997

Related U.S. Application Data

[60] Provisional application No. 60/017,952, May 20, 1996.
[51] Int. Cl.⁷ .................................................. G06F 11/00
[52] U.S. Cl. ................................................................ 714/6
[58] Field of Search ..................... 395/182.02, 182.03, 395/182.04, 182.11, 200.49, 849, 200.61, 182.01, 200.47, 200.53, 200.54, 200.59, 200.65; 714/6

[56] References Cited

U.S. PATENT DOCUMENTS

| | | | |
|---|---|---|---|
| 5,265,098 | 11/1993 | Mattson et al. | 714/710 |
| 5,513,314 | 4/1996 | Kandasamy et al. | 395/182.04 |
| 5,537,567 | 7/1996 | Galbraith et al. | 395/182.04 |
| 5,583,995 | 12/1996 | Gardner et al. | 395/200.49 |
| 5,621,882 | 4/1997 | Kakuta | 395/182.04 |
| 5,721,956 | 2/1998 | Martin et al. | 395/872 |
| 5,832,198 | 11/1998 | Lucht | 714/6 |

OTHER PUBLICATIONS

Distributed Multimedia Systems and Applications Hamza et al. (pp. 113–118), Aug. 1995.
S. Berson, L. Golubchik and R.R. Muntz, "Fault Tolerant Design of Multimedia Servers," in Proc. of SIGMOD Conference, pp. 364–375 (1995).
P.M. Chen, E.K. Lee, G.A. Gibson, R.H. Katz, and D.A. Patterson, "Raid:—Performance, Reliable Secondary Storage," submitted to ACM Computing Survey (1994).
R.R. Muntz and J.C. S. Lui, "Performance Analysis of Disk Arrays Under Failure," in Proceedings of the 16th Very Large Database Conference, pp. 162–173 (1990).
Antoine Mourad, "Reliable Disk Striping in Video–on–Demand Servers," in The Proceedings of the International Conference on Distributed Multimedia Systems and Applications, (Standford, CA Aug., 1995).
F.A. Tobagi, J. Pang, R. Baird, and M. Gang, "Streaming RAID: A Disk Storage System for Video and Audio Files," in Proceedings of ACM Multimedia, pp. 393–400 (Anaheim, CA Aug., 1993.).

*Primary Examiner*—Robert W. Beausoliel, Jr.
*Assistant Examiner*—Pierre E. Elisca

[57] ABSTRACT

A continuous media server that provides support for the storage and retrieval of continuous media data at guaranteed rates using one of two fault-tolerant approaches that rely on admission control in order to meet rate guarantees in the event of a failure of the data storage medium that renders part of the continuous media inaccessible. In the first approach, a declustered parity storage scheme is used to uniformly distribute the additional load caused by a disk failure, uniformly across the disks. Contingency bandwidth for a certain number of clips is reserved on each disk in order to retrieve the additional blocks. In the second approach, data blocks in a parity group are prefetched and thus in the event of a disk failure only one additional parity block is retrieved for every data block to be reconstructed. While the second approach generates less additional load in the event of a failure, it has higher buffer requirements. For the second approach, parity blocks can either be stored on a separate parity disk, or distributed among the disks with contingency bandwidth reserved on each disk.

15 Claims, 5 Drawing Sheets

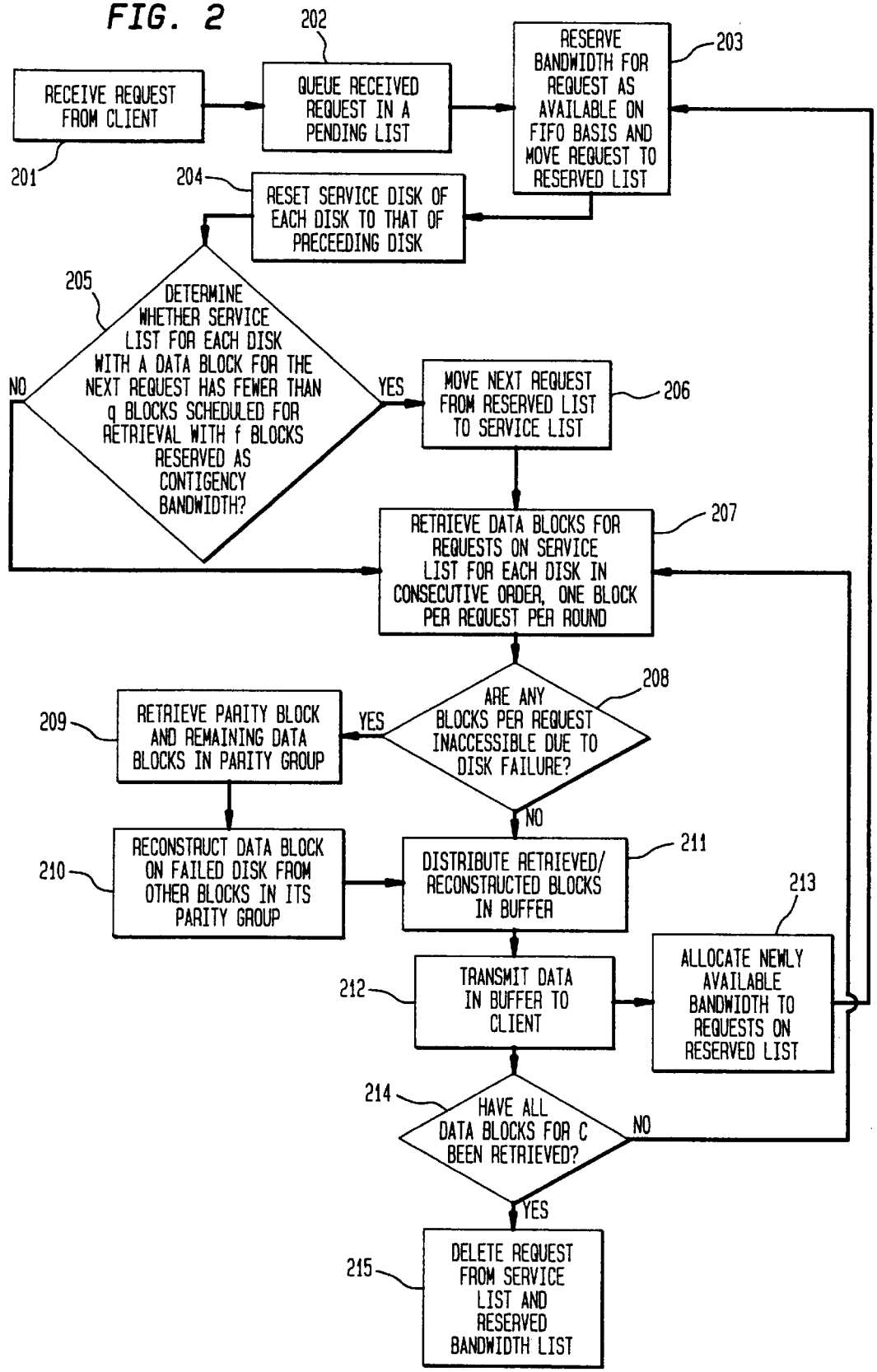

```
BEGIN
    i: = 0, j: = 0.
    REPEAT
        PLACE THE i^th DATA BLOCK ON DISK (i MOD d) IN DISK BLOCK NUMBER (i + n·r), WHERE n ≥ 0 IS THE MINIMUM
        VALUE FOR WHICH DISK BLOCK i + n·r IS NOT A PARITY BLOCK AND HAS NOT ALREADY BEEN ALLOCATED TO SOME DATA BLOCK
        i: = i + 1
        IF (i MOD d=0) THEN j: = (j + 1) MOD r.
    UNTIL ALL DATA BLOCKS ARE EXHAUSTED
END
```

FIG. 3

```
PROCEDURE COMPUTE OPTIMAL ()
BEGIN
    p: =p_opt: =p_min, q_opt: =0, f_opt: =0.
    WHILE (p ≤ d)
        USE BIBD TABLES TO DETERMINE BIBD FOR v = d, k = p AND λ = I(r=$\frac{d-1}{p-1}$).
        IF A BIBD EXISTS
            f: =0.
            REPEAT
                f: =f + 1.
                OBTAIN VALUE FOR q BY SOLVING EQUATIONS 1 AND 2 AFTER SUBSTITUTING FOR f AND p
            UNTIL r·f ≥ (q-f)
            IF q_opt-f_opt < q_max-f THEN q_opt: =q, p_opt: =p, f_opt: =f.
        END IF
        p: =p + 1
    END WHILE
    OUTPUT b_opt (OBTAINED AS A RESULT OF SOLVING EQUATION 1 WITH q=q_opt), p_opt AND f_opt
END
```

```
Procedure Compute Latency (i, C)
begin
    if usedbw(i) =q-f then return (∞ ,0).
    if for all rows j usedbw(i,j)=f then return (∞ ,0).
    let j be the row for which usedbw(i,j) < f and dist((i,j), (disk(C),row(C))) is minimum.
    return(dist((i,j), (disk(C), row(c))),j).
end
```

FIG. 4B

```
Procedure admission Control ()
begin
  for every entry e in the reserved list
    lat(e):= lat(e)-1, disk(e):= (disk(e)+1) mod d.
    if disk(e) = 0 then row(e):= (row(e)+1) mod r.
  end for
  for every clip for which the last data block was retrieved from disk i in the previous round
    disk:= (i + 1) mod d
    delete clip from disk's service list.
    for every entry e in the reserved list (in the order of their appearance in the list)
      (latency, row) = computeLatency (disk,clip(e)).
      if latency < lat(e) then
        swap contents of disk and disk(e)
        row(e):=row.lat(e):=latency
      end if
    end for
  end for
  for every requested clip C in the pending list (in the order of their appearance in the list)
    for i = 0,...d-1, let (latency_i, row_i)=ComputeLatency(i,C).
    if for some disk i.latency_i,∞ then
      let j be the disk for which latency_j is minimum.
      delete C from the pending list.
      append to the reserved list, entry e, such that disk(e) =j,row(e)=row_j, lat(e) =latency_j and clip(e)=C.
    end if
  end for
  for every entry e in the reserved list such that lat(e)=0
    delete e from the reserved list and add clip(e) to the service list for disk(e)
  end for
end
```

FAULT TOLERANT ARCHITECTURES FOR CONTINUOUS MEDIA SERVERS

CROSS REFERENCE TO PROVISIONAL APPLICATION

This application claims the benefit of U.S. Provisional Application Ser. No. 60/017,952, filed on May 20, 1996.

FIELD OF THE INVENTION

The present invention relates to continuous media servers for serving multimedia requests. In particular, the invention relates to a method and apparatus therefor, for providing a continuous transmission of stored multimedia at a prescribed rate in the event of a failure of the multimedia storage medium rendering the stored multimedia inaccessible.

BACKGROUND OF THE INVENTION

Rapid advances in computing and communication technologies have fueled an explosive growth in the multimedia industry. The realization of multimedia services such as multimedia messaging, online news, interactive television, and video on demand requires the development of large scale servers, continuous media ("CM") servers, that are capable of transmitting CM clips, generally stored on disks to thousands of users. A CM clip is generally a sequence of frames of audio, video or some multimedia combination, whose transmission should be without delays between frames. For example, a movie is a CM clip since it would be not desirable to view the movie if there were delays between frames. This is not to suggest, however, that a delay inserted purposefully such as to create a pause while viewing the movie, will render the movie a non CM clip.

To be effective a CM server must be designed to guarantee that each CM clip stored on the server can be retrieved and transmitted at a prescribed transfer rate which depends on the compression technique used to store the clip and the required display rate, e.g., 30 frames per second. One factor that can prevent the CM server from satisfying the transfer rate is disk failure. In other words, the CM server may be physically blocked from accessing the CM clip from the storage medium.

To illustrate, consider that a single one hundred minute MPEG-1 video clip requires approximately 1.25 GB of disk space. With commercially available disks having between two to nine gigabytes of storage capacity, a CM server will require access to many disks in order to store hundreds of clips. Considering that a single disk has a mean time failure of approximately three hundred thousand hours, the mean time failure of a server with two hundred disks is approximately fifteen hundred hours, or sixty days.

A number of schemes have been proposed for ensuring the availability of data on failed disks. Many of these schemes employ data redundancy. Examples include S. Berson, et al., "Fault Tolerant Design of Multimedia Servers," in Proceedings of SIGMOD Conference, pp. 364–375 (1995); D. Bitton and J. Gray, "Disk Shadowing," in Proceedings of the 14th Conference on Very Large Databases, pp. 331–338 (1988); P. M. Chen, et al., "RAID: High Performance, Reliable Secondary Storage," submitted to ACM Computing Surveys (1994); G. Gibson and D. Patterson, "Designing Disk Arrays for High Data Reliability," Journal of Parallel and Distributed Computing, pp. 4–27 (January 1993); Antoine Mourad, "Reliable Disk Striping in Video-On-Demand Servers," Proceedings of the Int'l Conference on Distributed Multimedia Systems and Application (August 1995); D. Patterson, et al., "A Case for Redundant Array of Inexpensive Disks (RAID)," in Proceedings of ACM SIGMOD '88 pp. 109–116 (June 1988); F. A. Tobagi, et al., "Streaming RAID—A Disk Array Management System for Video Files," in Proceedings of ACM Multimedia '93 pp. 393–400 (1993); and H. M. Vin, et al., "Efficient Failure Recovery in Multi-Disk Multimedia Servers," in Proceedings of the Twenty-Fifth Fault Tolerant Computing Symposium (June 1995), all of which are hereby incorporated by reference as if fully set forth herein.

Many of these techniques assume a RAID architecture in which fault tolerance is achieved either by mirroring, or by parity encoding. Mirroring techniques achieve fault tolerance by replicating data on separate disks and thus encounter a 100% storage overhead. Parity encoding, on the other hand, stores a single parity block with parity information for a group of data blocks, thereby reducing the storage space overhead. Typically, for a group of data blocks residing on different disks, a parity block containing parity information for those data blocks is stored on a separate disk. In the event a disk containing a data block fails, the lost data block is reconstructed from the remaining data blocks in its parity group and their associated parity block.

Most of the experimental, analytical, and simulation studies for RAID based disk arrays assume a conventional workload in which reads and writes from and to a disk, access small amounts of data are independent of each other, aperiodic, and do not impose any real time requirements. In contrast, access to CM data is sequential, periodic, and imposes real time constraints. Schemes that exploit the inherent characteristics of CM data for data placement and recovery, and that enable CM data to be retrieved at a guaranteed rate despite disk failures were proposed in Antoine Mourad, "Reliable Disk Striping in Video-On-Demand Servers," F. A. Tobagi, et al., "Streaming RAID—A Disk Array Management System for Video Files," S. Berson, et al., "Fault Tolerant Design-of-Multimedia Servers," and H. M. Vin, et al., "Efficient Failure Recovery in Multi-Disk Multimedia Servers," supra.

In "Reliable Disk Striping in Video-On-Demand Servers" mirror blocks of data blocks on one disk are distributed among the other disks accessible by the server. This scheme is plagued with a 100% storage overhead since every data block is replicated. In "Streaming RAID—A Disk Array Management System for Video Files," parity encoding techniques are used to group disks into clusters of p disks, each cluster comprising one parity disk and p−1 data disks. A set of p−1 data blocks, one block per data disk in a cluster, and its parity block stored on the parity disk in the cluster, form a parity group. The granularity of a read request is an entire parity group. As a result, the parity block is always available to reconstruct lost data in case a data disk fails. The streaming RAID scheme has high buffer requirements since it retrieves an entire parity group in every access.

To reduce buffer space overhead for environments in which a lower level of fault tolerance is acceptable, a non-clustered scheme was proposed in "Fault Tolerant Design of Multimedia Servers," where disks are organized in clusters comprising a single parity disk. In the event of a disk failure, entire parity groups are read, but only for parity groups containing the faulty disk. With this scheme, however, blocks for certain clips may be lost during the transition from retrieving individual data blocks to retrieving entire parity groups for a failed cluster. As a result, a viewer of the CM clip may encounter discontinuities in the playback.

Another scheme proposed in "Fault Tolerant Design of Multimedia Servers" eliminates parity disks and stores parity blocks from a first cluster in an adjacent second cluster. In the event of a disk failure within the first cluster, the parity blocks are retrieved from the adjacent second cluster. The data blocks that could not be retrieved from the adjacent cluster due to the time spent retrieving the additional parity blocks are treated as lost, and are reconstructed from parity blocks retrieved from the next adjacent cluster. The advantage of this scheme is that disk bandwidth is utilized effectively during normal operation. However, in the event of a disk failure, retrieval of parity blocks may propagate through every cluster resulting in an increase in buffer requirements, and possibly lost clips. Moreover, if bandwidth is not available on a particular disk containing parity blocks to be retrieved, one or more requests may have to be terminated.

SUMMARY OF THE INVENTION

A CM server which ensures, high data availability and continuity of a desired playback rate for CM clips in the presence of disk failures, by either preserving sufficient bandwidth in order to retrieve additional data blocks to reconstruct lost data blocks or pre-fetching every block necessary for recovery of data on a failed disk. Both schemes use uniform distribution of data and parity blocks to avoid the use of separate parity disks. To preserve sufficient bandwidth, clips are stored on disks using a declustered parity data storage scheme. The scheme ensures that in the event of a disk failure, the additional load, i.e., the data blocks needed to reconstruct the lost block, is uniformly distributed across the disks, thereby minimizing the amount of reserved bandwidth on each disk. Bandwidth on disks is reserved either a priori, or dynamically when data retrieval for a clip is initiated. For the dynamic reservation scheme, a parity group generation algorithm is presented to ensure that the number of disks on which bandwidth is reserved for a CM clip is bounded by the square of the parity group size.

As an alternative to preserving bandwidth on each disk, a data retrieval scheme can be employed in which data blocks belonging to a parity group are pre-fetched. In the event of a disk failure, only parity blocks have to be retrieved from the remaining disks, rather than all of the remaining data blocks in a parity group.

For both the declustered and prefetching schemes, starvation-free admission control algorithms are presented which provide low response times for client requests, and ensure the availability of appropriate disk bandwidth to reconstruct inaccessible data in the event of a disk failure. Techniques for determining optimal parity group and buffer sizes that maximize the number of clients that can be supported are presented as well.

BRIEF DESCRIPTION OF THE DRAWINGS

FIG. 2 is a flow chart showing the steps of the method of the present invention used to guarantee a desired transfer rate of a CM clip in the event of a storage element failure.

FIG. 3 is a preferred algorithm for distributing parity and data blocks among an array of disks in accordance with the declustered parity embodiment of the present invention.

FIG. 4A is a preferred algorithm for computing the number of rounds after which data retrieval for a particular clip can begin, where clips are distributed in accordance with a declustered parity scheme.

FIG. 4B is a preferred algorithm for reserving necessary bandwidth a priori, and for transferring clips from a pending list, to a reserved list, to a service list.

FIG. 5 is a preferred algorithm for determining optimal values for parity group size, block size and the amount of bandwidth to be reserved.

DETAILED DESCRIPTION OF THE INVENTION

Figure 1:
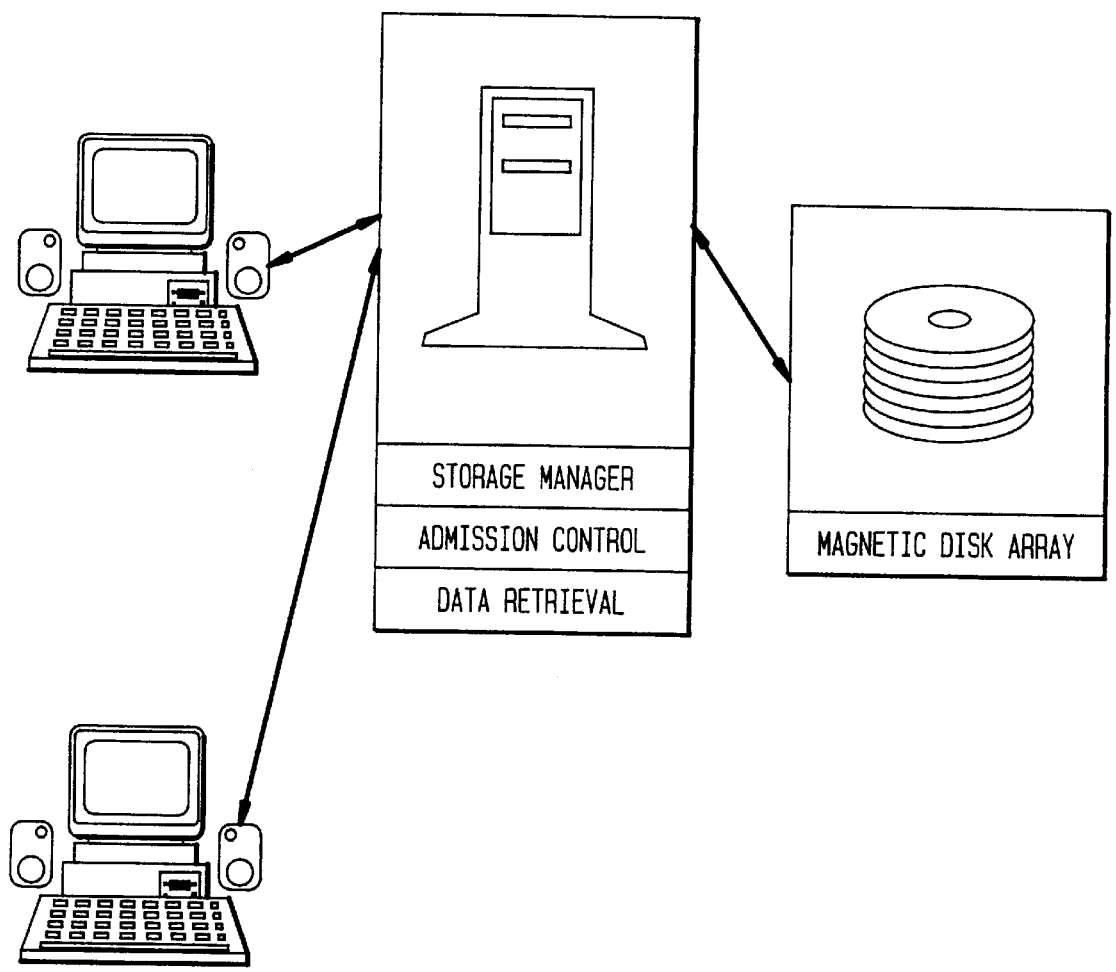
FIG. 1 illustrates the general architecture of a CM server.

For purposes of the following description, the phrase "CM clip" refers to a sequence of consecutive audio samples or video frames that have been encoded using a constant bit rate ("CBR") compression algorithm. Also, Table 1 lists the notations and values used herein for various disk parameters.

TABLE 1

| Inner track transfer rate | $r_d$ | 45 Mbps |
|---|---|---|
| Settle time | $t_{settle}$ | 0.6 ms |
| Seek latency (worst-case) | $t_{seek}$ | 17 ms |
| Rotational latency (worst-case) | $t_{rot}$ | 8.34 ms |
| Total latency (worst-case) | $t_{lat}$ | 25.5 ms |
| Disk capacity | $C_d$ | 2 GB |
| Playback rate for clip | $r_p$ | 1.5 Mbps |
| Block size | b | |
| Number of disks in server array | d | |
| Buffer size | B | |
| Parity group size | p | |
| Maximum number of clips serviced at a disk during a round | q | |

Referring to FIG. 1, CM server 110 is shown generally comprising three functional elements which distinguish the CM server from other server types. It is connected by an interface network means to clients 120 for receiving and delivering requests for CM clips, and has access to a magnetic disk array 130 for retrieving the requested CM clips. As shown in FIG. 1 and more fully described below, the three functional elements are: a storage manager responsible for data layout on the disks; admission control to determine whether a requesting client may be serviced; and data retrieval means for retrieving the stored data.

As CM clips are generally voluminous, they are usually striped across the array of disks in order to improve performance and uniformly distribute the load. Each stripe unit is referred to as a "block" whose size is denoted by b. The data blocks of each clip are concatenated sequentially with successive blocks stored on consecutive disks.

Referring to FIG. 2 Client requests for the playback of CM clips received as shown in block 201, are queued in a pending list, block 202 maintained by CM server 110. As described more fully below, Admission control determines for each of the queued requests, whether there is sufficient disk bandwidth to service the request block 205. If a request is serviceable it is added to the service list, block 207 and the CM server 110 retrieves the data blocks for the requested clip in a round robin fashion. During each round, a single block for every clip is retrieved from each disk using, for example, the C-SCAN disk scheduling algorithm described in A. Silberschatz and P. Galvin "Operating System Concepts" (Addisan-Wesley 1994), hereby incorporated by reference as if fully set forth herein. Since consecutive blocks for a clip are retrieved from consecutive disks in a round robin fashion, at the end of each round, each disk service list is set to that of the preceding disk, block 204. During consecutive rounds, consecutive blocks in the clip's buffer are scheduled for network transmission to clients, block 212. After transmission of each data block of a request Admission control determines whether there are any remaining data blocks to be retrieved for each request, block 214. If no blocks remain to be retrieved, the request is deleted from the service lists, block 215.

In order to maintain continuity of playback, the duration of a round must not exceed $$\frac{b}{r_p}.$$

This can be ensured by restricting the number of clips in each service list so that the time required by the server to retrieve blocks for clips in the service list does not exceed $$\frac{b}{r_p}.$$

Since, during a particular round, a disk head travels, at most twice across the disk, (due to C-SCAN scheduling) and retrieving data for each clip incurs in the worst case, a settle and a worst rotational latency overhead, the maximum number of clips that can be serviced during a round, denoted by q must satisfy $$q \cdot \left(\frac{b}{r_d} + t_{rot} + t_{settle}\right) + 2 \cdot t_{seek} \leq \frac{b}{r_p}.$$

For certain schemes, if a disk were to fail during a round, an additional seek may need to be performed and provided for, to retrieve the additional blocks.

The Static Declustered Parity Scheme

A declustered parity scheme is generally described in M. Holland and G. Gibson, "Parity Declustering for Continuous Operation in Redundant Disk Arrays," in Proceedings of the 5th Int'l Conference on Architectural Support for Programming Languages and Operating Systems, pp. 23–35 (October 1992); A. Merchant and P. S. Yo, "Design and Modeling of Clustered RAID," in Proceedings of the Int'l Symposium on Fault Tolerant Computing, pp. 140–149 (1992); and R. R. Muntz and J. C. S. Lui, "Performance Analysis of Disk Arrays Under Failure," in Proceedings of the 16th Very large Data Bases Conference, pp. 162–173 (1990), hereby incorporated by reference as of fully set forth herein.

In one preferred embodiment of this invention a declustered parity scheme is applied in substantial absence of any parity disks. In accordance with this embodiment of the present invention, parity and data blocks are uniformly distributed among the disks in the CM server's disk array. While parity disks are not necessary and indeed this elimination is one advantage of the present invention, one or more parity disks may be used if desired. In the event of a disk failure, each surviving disk incurs an on the fly reconstruction load of only $$\frac{p-1}{d-1} \%,$$

assuming the load on the array was balanced before the failure. The retrieved blocks of each parity group are distributed among a buffer of size 2b, block 211. Actual data transmission to a client is initiated with the first round after the first data block for a requested clip has been retrieved, block 212. In the event of a disk failure, determined in block 208, for every data block to be retrieved from the failed disk, the remaining blocks in its parity group are retrieved from the surviving disks instead, block 209 and used to reconstruct the lost data blocks, block 210.

As stated above, the storage manager of the CM server determines and manages data layout on the array of disks available to the server. In accordance with the declustered parity embodiment of the present invention, the uniform distribution of data and parity blocks among the d disks in the array can be determined using the theory of Balanced Incomplete Block Designs ("BIBD"), described in Jr. M. Hall, Combinational Theory (John Wiley & Sons 1986), hereby incorporated by reference as if fully set forth herein. A BIBD is an arrangement of v distinct objects in s sets, such that each set contains exactly k distinct objects. Each object occurs in exactly r different sets, and every pair of distinct objects occurs together in exactly $\lambda$ sets. The term "sets" is distinguished herein from the term 'blocks' "to avoid confusion between CM clip blocks and disk blocks. For a BIBD, the two equalities r·(k−1)=$\lambda$·(v−1) and s·k=v·r must be satisfied.

Thus, for certain values of v, k and $\lambda$, values of r and s are fixed. For example, for v=7, k=3, and $\lambda$=1, the values of r and s are 3 and 7, respectively. The complete BIBD for these values is as shown in Table 2, with objects numbered 0 through 6.

TABLE 2

| | | | |
|---|---|---|---|
| $S_0$ = {0, 1, 3} | $S_2$ = {2, 3, 5} | $S_4$ = {4, 5, 0} | $S_6$ = {6, 0, 2} |
| $S_1$ = {1, 2, 4} | $S_3$ = {3, 4, 6} | $S_5$ = {5, 6, 1} | |

In accordance with the declustered parity embodiment of the present invention, each disk is mapped to an object, v=d and s parity groups of size k=p are constructed, one group for every set. BIBDs for certain values of v, k and $\lambda$ that are known to exist can be found in "Combinational Theory," supra.

The BIBD is rewritten as a parity group table ("PGT") with a column corresponding to every disk and containing all the sets $S_i$ in the BIBD that contain the disk. The PGT contains r rows since each disk is contained in r sets. For the BIBD presented in the first example, (v=7, k=3 and $\lambda$=1), the PGT is as shown in Table 3.

TABLE 3

| 0 | 1 | 2 | 3 | 4 | 5 | 6 |
|---|---|---|---|---|---|---|
| $S_0$ | $S_0$ | $S_1$ | $S_0$ | $S_1$ | $S_2$ | $S_3$ |
| $S_4$ | $S_1$ | $S_2$ | $S_2$ | $S_3$ | $S_4$ | $S_5$ |
| $S_6$ | $S_5$ | $S_6$ | $S_3$ | $S_4$ | $S_5$ | $S_6$ |

Once the PGT is constructed, disk blocks are mapped to sets in the PGT. The $j^{th}$ block of disk i is mapped to the set contained in the $i^{th}$ column and the (i mod r)$^{th}$ row of the PGT. Furthermore, among the disk blocks in the interval [n·r,(n+1)·r−1],n≧0, the disk blocks that are mapped to the same set in the PGT form a parity group. Parity blocks are uniformly distributed among all the disks in successive parity groups that are mapped to the same set in the PGT. For the PGT of Table 3, Table 4 shows the sets to which the first nine blocks on each disk are mapped. A disk block containing $S_i^d$ is mapped to set $S_i$ and stores a data block, while a block containing $S_i^p$ is mapped to $S_i$ and stores a parity block. Block 0 on disks 0, 1 and 3 are all mapped to $S_0$ and thus form a single parity group. In the three successive parity groups mapped to set $S_0$ (on disk blocks 0, 3, and 6 respectively), parity blocks are stored on disks 3, 1, and 0.

TABLE 4

| 0 | 1 | 2 | 3 | 4 | 5 | 6 |
|---|---|---|---|---|---|---|
| $S^d_0$ | $S^d_0$ | $S^d_1$ | $S^p_0$ | $S^p_2$ | $S^p_1$ | $S^p_3$ |
| $S^d_4$ | $S^d_1$ | $S^d_2$ | $S^d_2$ | $S^d_3$ | $S^p_4$ | $S^p_5$ |
| $S^d_6$ | $S^d_5$ | $S^d_6$ | $S^d_3$ | $S^d_4$ | $S^d_5$ | $S^p_6$ |
| $S^d_0$ | $S^p_0$ | $S^p_1$ | $S^d_0$ | $S^d_1$ | $S^d_2$ | $S^d_3$ |
| $S^d_4$ | $S^d_4$ | $S^d_2$ | $S^d_2$ | $S^p_3$ | $S^p_4$ | $S^d_5$ |
| $S^d_6$ | $S^d_5$ | $S^p_6$ | $S^d_3$ | $S^p_4$ | $S^p_5$ | $S^d_6$ |
| $S^p_0$ | $S^d_0$ | $S^d_1$ | $S^d_0$ | $S^d_1$ | $S^d_2$ | $S^d_3$ |
| $S^p_4$ | $S^p_1$ | $S^p_2$ | $S^d_2$ | $S^d_3$ | $S^d_4$ | $S^d_5$ |
| $S^p_6$ | $S^p_5$ | $S^d_6$ | $S^p_3$ | $S^d_4$ | $S^d_5$ | $S^d_6$ |

After determining the distribution of parity and data blocks, the CM clips are stored on disks such that successive data blocks of a single clip are placed on consecutive disks in a round-robin manner. One preferred algorithm for distributing parity and data blocks is shown in FIG. 3. Referring to FIG. 3, during each iteration, the $i^{th}$ data block is stored in a disk block (on disk i mod d) that is mapped to the set contained in column (i mod d) and row j of the PGT. Furthermore, the $(i+1)^{th}$ data block is stored on disk ((i+1) mod d) in a block that is mapped to the set contained in column ((i+1) mod d), and row j if ((i+1) mod d)≠0 and row ((j+1) mod r), otherwise. Thus, consecutive data blocks are stored in disk blocks mapped to consecutive sets in a row of the PGT. Furthermore, once sets in a row are exhausted, data blocks are stored in blocks mapped to sets in the next row of the PGT. Table 5 illustrates the placement of data blocks for the mapping in Table 4.

TABLE 5

| 0 | 1 | 2 | 3 | 4 | 5 | 6 |
|---|---|---|---|---|---|---|
| $D_0$ | $D_1$ | $D_2$ | $P_0$ | $P_1$ | $P_2$ | $P_3$ |
| $D_7$ | $D_8$ | $D_9$ | $D_{10}$ | $D_{11}$ | $P_4$ | $P_5$ |
| $D_{14}$ | $D_{15}$ | $D_{16}$ | $D_{17}$ | $D_{18}$ | $D_{19}$ | $P_6$ |
| $D_{21}$ | $P_7$ | $P_8$ | $D_3$ | $D_4$ | $D_5$ | $D_6$ |
| $D_{28}$ | $D_{29}$ | $D_{30}$ | $P_9$ | $P_{10}$ | $D_{12}$ | $D_{13}$ |
| $D_{35}$ | $D_{36}$ | $P_{11}$ | $D_{38}$ | $P_{12}$ | $P_{13}$ | $D_{20}$ |
| $P_{14}$ | $D_{22}$ | $D_{23}$ | $D_{24}$ | $D_{25}$ | $D_{26}$ | $D_{27}$ |
| $P_{15}$ | $P_{16}$ | $P_{17}$ | $D_{31}$ | $D_{32}$ | $D_{33}$ | $D_{34}$ |
| $P_{18}$ | $P_{19}$ | $D_{37}$ | $P_{20}$ | $D_{39}$ | $D_{40}$ | $D_{41}$ |

$D_0, D_1, D_2 \ldots$ are the first data blocks of a clip and are therefore placed on block 0 of disk 0, disk 1, and disk 2 respectively. Data block $D_3$ is placed on disk 3, the next consecutive disk. However, since block 0 on disk 3 contains a parity block, $D_3$ is placed on block 3 of disk 3, which is the next available block on disk 3 that is mapped to $S_0$. Also, $P_0$ is the parity block for data blocks $D_0$ and $D_1$, while $P_1$ is the parity block for data blocks $D_8$ and $D_2$.

For a clip C, the notation disk (C) denotes the disk on which the first data block of C is stored and row (C) denotes the row that contains the set to which the first data block of C is mapped in column disk (C) of the PGT.

Having discussed the layout scheme and method of uniform distribution of the data and parity disks in accordance with the declustered parity scheme of the present invention, the next element of the CM server to be discussed is admission control. Admission control is necessary to ensure that the number of blocks to be retrieved from a disk during a round never exceeds q. If q is exceeded then the desired playback rate $r_p$ cannot be maintained. In the absence of a disk failure, this is achieved by ensuring that each service list contains at most q clips since one block per disk will be retrieved for each clip during each round. However, if q clips were serviced, there would be no reserved bandwidth in the event of a disk failure, thereby preventing the CM server from retrieving the necessary additional blocks from the surviving disks to reconstruct the last data blocks and deliver them to the client at the desired playback rate $r_p$. For this reason, contingency bandwidth for retrieving a certain number of blocks must be reserved for each disk.

The number of additional blocks to be retrieved from the surviving disks depends on the manner in which parity groups are constructed. For the declustered storage scheme described above, parity group construction involves two general properties. First, parity groups for data blocks on a disk that are mapped to the same row of the PGT involve the same disks, while parity groups for data blocks on a disk that are mapped to different rows have only one disk in common. This is because any two distinct sets in the PGT have at most one disk in common. Second, for any two data blocks on a disk mapped to distinct rows, the two data blocks that follow each of them, in their respective clips, are mapped to the same distinct rows.

Thus, assuming contingency bandwidth for retrieving f blocks is reserved on each disk, the admission control needs to ensure that: (i) the number of clips being serviced during a round at a disk never exceeds q−f; or that the number of additional blocks retrieved from a disk during a round, in the event of a disk failure, will not exceed f, and the total number of blocks retrieved from a disk during a round will not exceed q and (ii) the number of data blocks mapped to the same row and being retrieved from a disk during a round never exceeds f. This second requirement ensures that if during a round, the number of data blocks retrieved from a disk and mapped to the same row is at most f, then during the next round (assuming data retrieval for no new clips is initiated), the number of data blocks retrieved from the following disk and mapped to the same row is at most f. As discussed more fully below, since the number of clips that can be serviced by a disk has an upper bound of the lesser of r−f and q−f the value for f must be chosen judiciously so as to maximize the number of clips that can be serviced.

In one advantageous embodiment, admission control reserves disk bandwidth for requested clips in the pending list in a particular order such as "first come first serve," block 203. This allows for efficient use of disk bandwidth while preventing starvation, i.e., a request that is never served because there is always a different request that is more efficient to be serviced. Furthermore, as data retrieval for a clip, is completed and bandwidth is thus made available, the newly available bandwidth is used to reduce the response time for clips already with reserved bandwidth, block 203.

To explain further, the CM server maintains, in addition to the pending list, a reserved list which contains requested clips that have been allocated bandwidth and are awaiting service. The reserved list is initially empty. Each entry e in the reserved list contains the requested clip for which bandwidth is reserved denoted by clip(e). The disk and row on which bandwidth is reserved is denoted by disk(e) and row(e), respectively, and the number of rounds after which data retrieval for the requested clip can be initiated is denoted by lat(e). Note that since during successive rounds consecutive blocks for a clip are retrieved from consecutive disks, if bandwidth is reserved for a clip on disk i and row j, then during the next round, bandwidth is reserved for the clip on disk ((i+1) mod d) and either row j if ((i+1) mod d)≠0, or row ((i+1) mod r) if ((i+1) mod d)=0. Data retrieval for a clip C is initiated once bandwidth is reserved for C on disk(C) and row(C).

To explain, consider disks i and m, and rows j and n. The function dist((i, j), (m, n)), defined below, is such that if bandwidth is reserved on disk i and row j for a clip during a round, then after dist((i, j), (m, n)) rounds, bandwidth is reserved for the clip on disk m and row n.

$$\text{dist}((i, j), (m, n)) = \begin{cases} (m-i) + d \cdot (n-1) & \text{if } n \geq j \text{ and } m \geq i \\ (m-i) + d \cdot (r-j+n) & \text{if } n < j \text{ and } m \geq i \\ (d-i+m) + d \cdot (n-j-1) & \text{if } n > j \text{ and } m < i \\ (d-i+m) + d \cdot (r-j-1+n) & \text{if } n \leq j \text{ and } m < i \end{cases}$$

Thus, for an entry e in the reserved list, lat(e), the number of rounds after which data retrieval for clip (e) can begin is given by dist((disk(e), row(e)), (disk(clip(e)), row(clip(e)))).

Referring to FIG. 4A, pseudo code is given for one advantageous algorithm to compute dist ((i, j), (m, n)) usedbw(i) denotes the sum of the number of clips in disk i's service list and the number of clips with reserved bandwidth on disk i. Usedbw(i, j) denotes the sum of the number of clips accessing blocks on disk i and mapped to row j, and the number of clips with reserved bandwidth on disk i, row j.

Refer-ring to FIG. 4B, pseudo code is given for one advantageous algorithm for reserving appropriate bandwidth and for transferring requested clips between the pending, reserved and the service lists. The admission control algorithm reserves bandwidth for clips in a manner that usedbw (i) for all disks i, does not exceed q−f and usedbw(i, j) for all disks i, rows j, does not exceed f. This ensures that initiating data retrieval for clip(e) after lat(e) rounds does not cause the number of clips being serviced at disk(clip(e)) to exceed q−f, or the number of data blocks retrieved from disk(clip(e)), row(clip(e)) to exceed f.

The admission control algorithm is executed before data retrieval, at the start of each new round, after the service list for each disk has been updated. The computeLatency procedure, invoked by the admissionControl procedure returns (∞, 0) if reserving bandwidth for C on disk i could violate either one of the two admission control requirements.

At the completion of each round, disk bandwidth becomes available and the admissionControl procedure updates the reserved bandwidth information for every reserved list entry transmitted, thereby reducing the latency period for each clip on the reserved list. The bandwidth is reserved on a disk and row for a clip on the pending list that results in the minimum waiting time for that clip. In addition, requested clips in the pending list are appended to the reserved list in the order they are received.

As an example, consider a server with seven disks, parity group size 3, and 100 clips $C_0, \ldots C_{99}$ (the number of rows in the PGT is 3). Let q=5 and f=2, disk($C_1$)=disk($C_2$)=6, row($C_1$)=0 and row($C_2$)=1. Suppose that, at the start of a certain round, the reserved list is empty, usedbw(0)=usedbw (3)=2, usedbw for the remaining disks equals 3, and usedbw (0, 1)=usedbw(3, 2)=2. Thus, bandwidth for a single clip is available on disks 0 and 3. At the start of the round, let the pending list contain a request for clip $C_1$ followed by one for $C_2$. Due to procedure admissionControl, the bandwidth on disk 3, row 0 would be reserved for $C_1$ since it results in the minimum wait time for $C_1$. Since usedbw(0, 1)=2, bandwidth on disk 0, row 0 would be reserved for $C_2$ (wait time for $C_2$ is 12). Thus, the sum of start times for $C_1$ and $C_2$ is 15. Note that if $C_1$ is assigned the bandwidth on disk 0, row 0 (wait time for $C_1$ is 6), and $C_2$ is assigned the bandwidth on disk 3 and row i (wait time for $C_2$ is 3), then the sum of start times for $C_1$ and $C_2$ is 9.

The reason why procedure admissionControl results in larger wait times is that usedbw(0, 1) equals 2. If, instead, usedbw(0, 1) was less than 2, then $C_2$ would have been allocated bandwidth (by admissionControl) on disk 0, row 1 (instead of row 0) resulting in a wait time of 6 (instead of 12). Thus, the sum of wait times for $C_1$ and $C_2$ would be 9 instead of 15.

The Dynamic Declustered Parity Scheme

In the declustered parity scheme presented above, f is determined a priori, and contingency bandwidth for retrieving f blocks is always reserved on every disk regardless of the load on the system. Thus, in certain cases, disk bandwidth is often underutilized and response times for display of video clips is not as short as possible.

To illustrate consider a disk i, row j for which usedbw(i, j)=f and a pending list with clip C for which disk(C)=i and row(C)=j. In this case, even if usedbw(i) is less than q−f, in other words disk i has available bandwidth, data retrieval for clip C cannot be initiated. Next, consider usedbw(m, n)≦f', where f'<f for all disks m, rows n. In addition, for a disk i, row j, usedbw(z)=q−f and usedbw(i, j)<f'. In such a case, a clip C in the pending list for disk(C)=i row(C)=j cannot be serviced even though extra bandwidth for retrieving at most f blocks is needed on each disk in order to reconstruct data blocks in case of a disk failure. Thus, bandwidth for retrieving f−f' blocks on each disk is unavailable for servicing clips, and is therefore wasted.

To avoid the first problem, f must be chosen to have a large value. On the other hand, to avoid the second problem, f must be chosen to have a small value. Thus, it is difficult to select a single value for f, a priori, that would result in good disk utilization for a wide range of workloads.

To address this problem the declustered parity embodiment of the present invention presented above can be modified so that instead of reserving f blocks on each disk, a priori, contingency bandwidth is reserved only for the set of disks involved in the parity groups for the data blocks of a clip on the reserved list. Thus, the contingency bandwidth reserved on a disk changes dynamically with the system workload.

In this dynamic embodiment, data is distributed across the disk in a fashion similar to that of the static declustered scheme. A PGT is constructed, and disk blocks are mapped to sets in the PGT to store data and parity blocks. However, in the dynamic scheme all the data blocks of a single clip can only be mapped to the same row of the PGT, while with the static scheme they can be mapped to any row of the PGT. Consequently, in the dynamic schemes clips are concatenated to form r different super-clips, one super clip for each of the r rows of the PGT. Successive blocks of each super-clip are stored on consecutive disks in a round robin fashion, with super-clip $SC_k$ stored only on disk blocks mapped to sets in row k of the PGT. Thus, when placing consecutive blocks of $SC_k$, the $i^{th}$ block is stored on disk (i mod d) on block number k+n·r, where n greater than 0 is the minimum value for which disk block k+n·r is not a parity block and has not already been allocated to some previous data block belonging to $SC_k$.

To overcome a disk failure, the dynamic reservation scheme requires that as a data block mapped to set $S_m$ is retrieved from disk j contingency bandwidth for retrieving a single block is reserved on every disk other than j, denoted as disk i, in which $S_m$ occurs in column i of the PGT. This is important since these are the disks with the remaining blocks of the same parity group. In the event disk j fails there would be enough bandwidth to retrieve the remaining blocks in the data block parity group.

In order to provide continuity of playback rate for clips, the server may not be allowed to retrieve more than q blocks from a disk. This can be ensured by employing a variant of procedure admissionControl illustrated in FIG. 4B. As before, a reserved list is maintained for all clips for which bandwidth has been reserved. However, since every clip's data blocks are mapped to a single row of the PGT, bandwidth for a particular clip is reserved to a disk, as opposed to a disk and a row. Furthermore, data retrieval for a clip C in the reserved list is initiated once the bandwidth for the clip is reserved on disk(C). Thus, for every reserved list entry e, disk(e) is the disk on which bandwidth for clip(e) is reserved, and lat(e) is the number of rounds after which the reserved bandwidth on disk(e) is reserved on disk(clip(e)).

In addition to the reserved list, a contingency list is maintained with every disk. The contingency list for a disk contains an entry for every clip that has reserved contingency bandwidth on the disk. Each entry for clip C contains the row for the clip row(C), and either the disk whose service list contains C or the disk on which bandwidth for C is reserved (if C is on the reserved list).

The variant of the procedure illustrated in FIG. 4B performs, in addition to the functions described above, the following actions on the contingency lists. First, contingency bandwidth is reserved for each clip for which there is reserved bandwidth. In other words, when bandwidth is reserved on disk j, an entry for C containing row(C) as the row and j as the disk is inserted into the contingency list for disk $(j+\delta)$ mod d, for all $\delta \in \Delta_{row}$. Next, after all the data for a clip has been retrieved, the entries for the clip on the contingency lists and the service list are deleted. Every time a new disk j is assigned to a clip C in the reserved list, the old contingency list entries for the clip are deleted and a new entry for C is inserted into the contingency list for disk $(j+\delta)$ mod d, for all $\delta \in \Delta_{row(C)}$. Furthermore, at the end of each round, the contingency list for each disk is set to the contingency list for the previous disk, and for every entry in the contingency list, the disk value i is set to $(i+1)$ mod d. Thus, during successive rounds, contingency bandwidth on successive disks is reserved for a clip.

Admission control can ensure that the number of blocks retrieved from a disk during a round does not exceed q by reserving bandwidth for clips such that for every disk i, the sum of usedbw(i) and $\max\{cont_i\ (i, i):\ 0 \leq j < d \wedge 0 \leq 1 < r\}$, where conti (i, i) is the number of entries in the contingency list for disk i containing disk j and row i never exceeds q. In the event disk j fails, then for a row i, only conti (j, i) additional blocks need to be retrieved from disk i. Thus, the procedure computeLatency returns $(\infty, 0)$ if reserving bandwidth for clip C on disk i and reserving contingency bandwidth for C on disks $(i+\delta)$ mod d, for all $\delta \in \Delta_{row(C)}$ causes the above condition to be violated. Else, it returns the minimum number of rounds it takes the reserved bandwidth on disk i to reach disk(C).

For any given values of d and p, multiple PGTs are possible, and the size of $\Delta_i$'s for the different PGTs can vary. The size of $\Delta_i$ for a row i of the PGT determines the number of contingency bandwidth reservations that need to be made on disks, which in turn determines disk utilization. The fewer reservations necessary, the more clips that can be serviced. The size of $\Delta_i$ in turn, depends on the manner in which the PGT is constructed. Ideally, the PGT should be constructed such that for each row i, $\Delta_i$ contains as few elements as possible since this would result in better disk utilization.

TABLE 6

| PGT₁ | | | | | | | |
|---|---|---|---|---|---|---|---|
| 0 | 1 | 2 | 3 | 4 | 5 | 6 | 7 |
| $S_0$ | $S_1$ | $S_2$ | $S_3$ | $S_0$ | $S_1$ | $S_2$ | $S_3$ |
| $S_4$ | $S_6$ | $S_7$ | $S_7$ | $S_5$ | $S_4$ | $S_6$ | $S_6$ |
| $S_8$ | $S_{11}$ | $S_{11}$ | $S_{10}$ | $S_{10}$ | $S_9$ | $S_8$ | $S_9$ |
| $S_{12}$ | $S_{15}$ | $S_{14}$ | $S_{13}$ | $S_{15}$ | $S_{14}$ | $S_{13}$ | $S_{12}$ |
| $S_{16}$ | $S_{18}$ | $S_{17}$ | $S_{16}$ | $S_{19}$ | $S_{19}$ | $S_{18}$ | $S_{17}$ |
| $S_{20}$ | $S_{21}$ | $S_{20}$ | $S_{21}$ | $S_{22}$ | $S_{23}$ | $S_{23}$ | $S_{22}$ |
| $S_{24}$ | $S_{24}$ | $S_{25}$ | $S_{26}$ | $S_{25}$ | $S_{26}$ | $S_{27}$ | $S_{27}$ |

| PGT₂ | | | | | | | |
|---|---|---|---|---|---|---|---|
| 0 | 1 | 2 | 3 | 4 | 5 | 6 | 7 |
| $S_0$ | $S_1$ | $S_2$ | $S_3$ | $S_0$ | $S_1$ | $S_2$ | $S_3$ |
| $S_4$ | $S_5$ | $S_6$ | $S_7$ | $S_5$ | $S_6$ | $S_7$ | $S_4$ |
| $S_8$ | $S_9$ | $S_{10}$ | $S_{11}$ | $S_{10}$ | $S_{11}$ | $S_8$ | $S_9$ |
| $S_{12}$ | $S_{13}$ | $S_{14}$ | $S_{15}$ | $S_{15}$ | $S_{12}$ | $S_{13}$ | $S_{14}$ |
| $S_{16}$ | $S_{17}$ | $S_{16}$ | $S_{17}$ | $S_{18}$ | $S_{17}$ | $S_{18}$ | $S_{17}$ |
| $S_{20}$ | $S_{21}$ | $S_{21}$ | $S_{20}$ | $S_{22}$ | $S_{23}$ | $S_{23}$ | $S_{22}$ |
| $S_{24}$ | $S_{24}$ | $S_{25}$ | $S_{25}$ | $S_{26}$ | $S_{26}$ | $S_{27}$ | $S_{27}$ |

Consider the two PGTs of Table 6, for d=8 and p=2. The PGT has the property that any two columns have at most one set in common. It also has the desirable property that the size of each $\Delta_i$ does not exceed $2 \cdot p \cdot (p-1)$, which implies that the size of $\Delta_i$ is independent of d. However, a pair of columns may have no sets in common; thus, the number of rows in the PGT may be less than $$r = \frac{d-1}{p-1}.$$

In contrast, every pair of columns of the PGT of Table 3 has exactly one set in common and $$r = \frac{d-1}{k-1}$$

rows.

The Pre-Fetching with Parity Disk Scheme

In the foregoing declustered parity schemes, to reconstruct a lost data block, all of the blocks in its parity group have to be retrieved from the surviving disks. Accordingly, a significant amount of bandwidth has to be reserved on each disk to handle the additional load in the event of a disk failure. As a result, under non failure circumstances the disks are underutilized. One alternative to the declustered scheme is to retrieve all of the data blocks belonging to a parity group before the first data block of the parity group is accessed. In the event of a disk failure, since the remaining data blocks in its parity group have already been retrieved, only sufficient bandwidth to retrieve the group parity block is required.

This "prefetching" scheme was known using a parity disk. The d disks available to the CM server are grouped into clusters of size p with a single dedicated parity disk within each cluster to store parity blocks. The data blocks are stored on consecutive data disks using a round robin placement scheme as described above, with the first data block of each CM clip stored on the first data disk within a cluster. The p–1 consecutive data blocks in a single cluster along with the corresponding parity block form a parity group.

For each clip to be retrieved, a buffer of size p·b is allocated. The CM server first reads p–1 disks, buffers the retrieved data blocks of an entire parity group and only then initiates transmission to a client. Thus, at the start of any round, the next p−1 data blocks to be transmitted are already in the buffer. During each round, a data block belonging to the clip is transmitted from the buffer, and another data block is retrieved and placed in the buffer.

In the event of a disk failure, the parity block in its parity group is retrieved instead of the inaccessible data block. Thus, for a parity group with a data block on the failed disk, p−2 data blocks and the parity block are in the buffer at the start of the round in which the first data block in the group is transmitted, and are used to reconstruct the inaccessible data block on the failed disk. Accordingly, all of the data blocks for a clip are always available for transmission.

The Pre-Fetching with Uniform Parity Placement Scheme

Maintaining a separate parity disk per cluster can lead to inefficient disk bandwidth utilization since most of the parity disks remain idle. In another advantageous embodiment of the present invention efficiency is improved by uniformly distributing parity blocks for successive parity groups within a cluster. In particular, the parity block for the $i^{th}$ data block is placed on the $(i \bmod (d-(p-1)))^{th}$ disk following the last disk of the cluster. Table 7 depicts this uniform, flat placement for a disk array with 9 disks, a cluster size of 3 and a parity group size of 4. $D_0, D_1, \ldots$ denote consecutive data blocks and $P_i$ is the parity block for data blocks $D_{3i}$, $D_{3i+1}$ and $D_{3i+2}$.

TABLE 7

| 0 | 1 | 2 | 3 | 4 | 5 | 6 | 7 | 8 |
|---|---|---|---|---|---|---|---|---|
| $D_0$ | $D_1$ | $D_2$ | $D_3$ | $D_4$ | $D_5$ | $D_6$ | $D_7$ | $D_8$ |
| $D_9$ | $D_{10}$ | $D_{11}$ | $D_{12}$ | $D_{13}$ | $D_{14}$ | $D_{15}$ | $D_{16}$ | $D_{17}$ |
| $D_{18}$ | $D_{19}$ | $D_{20}$ | $D_{21}$ | $D_{22}$ | $D_{23}$ | $D_{24}$ | $D_{25}$ | $D_{26}$ |
| $D_{27}$ | $D_{28}$ | $D_{29}$ | $D_{30}$ | $D_{31}$ | $D_{32}$ | $D_{33}$ | $D_{34}$ | $D_{35}$ |
| $D_{36}$ | $D_{37}$ | $D_{38}$ | $D_{39}$ | $D_{40}$ | $D_{41}$ | $D_{42}$ | $D_{43}$ | $D_{44}$ |
| $D_{45}$ | $D_{46}$ | $D_{47}$ | $D_{48}$ | $D_{49}$ | $D_{50}$ | $D_{51}$ | $D_{52}$ | $D_{53}$ |
| $P_{10}$ | $P_{13}$ | $P_{16}$ | $P_0$ | $P_3$ | $P_6$ | $P_9$ | $P_{12}$ | $P_{15}$ |
| $P_2$ | $P_5$ | $P_8$ | $P_{11}$ | $P_{14}$ | $P_{17}$ | $P_1$ | $P_4$ | $P_7$ |

Since the parity blocks in this second pre-fetching scheme are stored on disks containing data blocks and not separate parity disks, each disk must have reserved bandwidth for retrieving the additional parity blocks in case of a disk failure. Assuming that sufficient bandwidth to retrieve f data blocks from each disk is reserved, and parity blocks for the $i^{th}$ data block and the $(i+j\cdot(d-(p-1)))$ data block on a disk $j>0$ are stored on the same disk, the admissionControl procedure must ensure that the number of clips in the service list for a disk never exceeds q−f, and the number of clips accessing data blocks with parity blocks on the same disk does not exceed f.

Determining Parity Group Size

Having described two general data layout schemes based on the concept of a parity group for use in accordance with the present invention, the next consideration is determining advantageous sizes of the parity group p, data or parity block b, and the amount of reserved bandwidth f. Let S be the total storage requirements for the clips. Since only $$\frac{p-1}{p}$$

of the storage space on the d disks is available to store data blocks, $$\frac{p-1}{p} \cdot C_d \cdot d,$$

must not be less than S. Thus, the minimum value for p, denoted by $$p_{\min}, \text{ is } \frac{d \cdot C_d}{d \cdot C_d - S}.$$

During normal execution of the declustered parity scheme, a buffer of size 2b is required for each clip and at most q−f clips are serviced at each disk. However, in case a disk fails, (p−1)b additional buffer space is required to store the p−1 additional blocks for each clip being serviced on the failed disk. Thus, the total buffer space B cannot be less than 2·(q−f)·(d−1)·b+(q−f)·p·b.

This buffer constraint yields an upper bound on the data block size. Substituting this upper bound on b into the continuity of playback constraint $$q \cdot \left(\frac{b}{6_d} + t_{rot} + t_{settle}\right) + 2 \cdot t_{seek} \leq \frac{b}{r_p}$$

yields an equation that can be solved for q. Since this value of q is a function of the parity group size and the reserved bandwidth on each disk, optimal values for p and f can be determined by varying p and f, and choosing those values that maximize q−f.

Note that the maximum number of clips that can be serviced during a round is f·r since only f clips can access data blocks mapped to a single row. As a result, must be chosen so that q−f≦f·r since otherwise, it may not be possible to service q−f clips at a particular disk. One preferred procedure for optimizing values for b, p and f is shown in FIG. 5.

For the pre-fetching, uniform parity placement scheme, in addition to the continuity of playback constraint on each disk, since each disk can service q−f clips and the buffer space per clip is p·b, the buffer constraint requires that p·b·(q−f)·d≦B. By substituting this upper bound on b into the continuity of playback constraint equation, q can be solved as a function of p and f. The number of clips that can be supported by the server can be maximized by varying the values of p from $p_{min}$ to d, varying f from 1 until f·(d−(p−1))≦(q−f) is satisfied, and choosing those values that maximize q−f.

For the pre-fetching scheme with dedicated parity disks, the effective number of disks in the array is only d, and each disk p can support q clips. Thus $$p \cdot b \cdot q \cdot \left(d \cdot \frac{p-1}{p}\right) \leq B$$

is a necessary buffer constraint which can be used as above to solve for q as a function of p. From this we can determine the optimal value for p, maximizing $$\frac{q \cdot d \cdot (p-1)}{p},$$

which is the total number of serviced clips.

Analytical techniques to compute the maximum number of clips that can be concurrently serviced by the server, and simulations to compute the number of clips serviced by each of the schemes in a certain time interval, were used to compare the performance of the various schemes presented above. For the following analysis, the parity group sizes were 2, 4, 8, 16 and 32. Two server configurations were considered in which the buffer size B was 256 MB and 2 GB, respectively, and the number of disks d was 32. Clips are assumed to be compressed using the MPEG-1 algorithm.

It was determined that the number of clips that can be serviced by the various schemes varies with parity group size. Both the declustered parity and the pre-fetching without parity disk schemes support fewer clips with larger parity group sizes. The reason for this is that, for the declustered parity scheme, as the parity group size increases, the number of rows in the PGT decrease and as a result, it becomes necessary to reserve contingency bandwidth for more blocks on each disk to satisfy the inequality, $r \cdot f \geq (q-f)$. Also, for the pre-fetching without parity disks scheme, the increase in parity group results in a proportionate increase in the buffer size required for each clip.

For the prefetching with parity disk, increasing the parity group size initially results in an increase in the number of clips serviced. This is because with a parity group size of two, bandwidth on half the disks is not utilized, while with a parity group size of four, bandwidth on only a quarter of the disks is not utilized. Thus, since disk bandwidth is more effectively utilized as the parity group size increases, an increase in the number of clips serviced is initially observed as the parity group size increases. However, with increasing parity group sizes, the buffer requirements per clip also increase. Thus, beyond a parity group size of eight, the improvement in the utilization of disk bandwidth due to the increasing parity group size is offset by the increase in buffer requirements. This causes the number of clips serviced by the schemes to decrease.

With a buffer of 256 MB, buffer space is scarce and so it is advantageous to employ the declustered parity scheme which has smaller buffer requirements than the prefetching scheme. The pre-fetching without parity disk scheme performs better than the prefetching with parity disk for small parity group sizes since it does not waste the bandwidth on an entire parity disk. However, as the parity group size increases, the prefetching with parity disk scheme utilizes disk bandwidth more effectively. In addition, the buffer requirements of the prefetching without parity disks scheme increase more rapidly than that of the declustered scheme. As a result, at parity group sizes of 8 and 16, respectively, the prefetching with parity disk scheme services more clips than the prefetching scheme without parity disks.

With a 2 GB buffer, since one of the primary merits of the declustered parity scheme is that its buffer requirements are small, it no longer outperforms the other schemes. It services fewer clips than the prefetching without parity disk scheme since it requires a larger amount of contingency bandwidth to be reserved on each disk than the prefetching without parity disk scheme. Thus, even though the declustered parity scheme requires less buffer space per clip than the prefetching without parity disk scheme, since it poorly utilizes disk bandwidth and buffer space is abundant, the prefetching without parity disk scheme outperforms it. For small parity group sizes such as two and four, the prefetching with parity disk performs worse than the declustered parity scheme, since compared to declustered parity, it does not utilize disk bandwidth well, and at the same time, has higher buffer requirements. However, for parity group sizes of sixteen and thirty two, the declustered parity scheme requires ⅓ and ½, respectively, of the bandwidth on each disk to be reserved, while the prefetching with parity disk scheme has one parity disk. Thus, since the declustered parity scheme utilizes disk bandwidth poorly, even though its buffer requirements are much smaller, since ample buffer space is available, the prefetching with parity disk scheme outperforms it.

To evaluate the effectiveness of the foregoing schemes, simulations were performed using a disk array with 32 disks. Each disk employed the C-SCAN scheduling algorithm when retrieving data blocks. The CM server stored 1000 clips each of length 50 time units. Blocks of each clip were interleaved across the entire array using a round robin placement scheme policy, and for every clip C, disk(C) and row(C) were randomly chosen. For every scheme, the block size for each parity group was chosen using techniques described above to maximize the total number of clips that can be concurrently serviced. Arrival of client requests into the system was assumed to be Poisson (the mean rate is set at 20 arrivals per unit time), and the choice of the clip for playback by a request is assumed to be random. For each parity group size, for every scheme, the simulation was run for 600 time units. The metric used to evaluate the schemes was the number of clips serviced by the server per unit time, and was obtained by dividing the total number of clips serviced, by 600. This metric reflects the overhead imposed by the fault tolerant scheme on the system. A higher overhead would require the system to be run at lower values of utilization, thereby restricting the entry of clients into the system.

Similar to the results presented above, for the declustered parity scheme and the prefetching scheme without parity disks, the number of clients serviced decreased as the parity group size increased. Also, with the prefetching scheme with parity disks, the number of clients serviced per unit time first increased with parity group size, and then began to decrease.

At a higher buffer size of 2 GB, the performance of the declustered parity scheme quickly deteriorated. Beyond a parity group size of 4, fewer clips per unit time were serviced than with the other schemes. The prefetching scheme without parity disks performed worse than prefetching with parity disk for parity group sizes 8 and 16.

The foregoing merely illustrates the principles of the present invention. Those skilled in the art will be able to devise various modifications, which although not explicitly described or shown herein, embody the principles of the invention and are thus within its spirit and scope.

What is claimed is:

1. A method for servicing one or more requests for a continuous media clip stored on a plurality of data storage mediums at a desired playback rate, said method comprising the steps of:

reserving available bandwidth for each of said requests on a particular order;

maintaining a reserved list of all said requests having reserved bandwidth, said requests on said reserved list represented as reserved requests;

maintaining a service list corresponding to each of said plurality of data storage mediums each of said service lists listing a number of said reserved requests having a unit of data on said service list's corresponding data storage medium, said reserved requests on each of said service lists representing a request in service, said number of requests in service limited such that the total bandwidth necessary for said requests in service does not exceed the maximum bandwidth for servicing a request for a continuous media clip at said desired playback rate, minus an amount of contingency bandwidth;

determining from each of said service lists if excess bandwidth is available on a corresponding data storage medium to service a next reserve request on each of said service lists;

moving in response to said determining step, said next reserved request from said reserved list to a service list with excess bandwidth and for which a unit of data of said request resides on said corresponding data storage medium;

retrieving at least one unit of data for each request service from each data storage medium;

determining whether any of said units of data are inaccessible due to a failure of one of said data storage mediums;

reconstructing said inaccessible units of data; and transmitting said retrieved and reconstructed units of data at said playback rate.

2. A method according to claim 1 wherein the amounts of said contingency bandwidth is determined for each data storage medium.

3. A method according to claim 1 wherein the amount of said contingency bandwidth is determined after each round of retrieving said units of data of said requests in service, and is allocated only for those of said data storage mediums to be accessed during a next subsequent round of retrieval.

4. A method according to claim 1 wherein said inaccessible units of data includes one of p units of data comprising p−1 units of data of a continuous medium clip and one units of parity data, said p units of data comprising a parity group, said reconstructing step involves retrieving each of said accessible units of data of said parity group of said inaccessible unit of data.

5. A method according to claim 1 wherein each of said units of data to be retrieved is one of p units of data of a parity group, said parity group comprising p−1 units of data of at least one continuous media clip and one unit of parity data, said retrieving step further comprising retrieving said parity group of said unit of data of said request, other than said unit of parity data, and wherein said reconstructing step further comprises retrieving said unit of parity data of said parity group.

6. A method according to claim 1 further comprising the steps of:

allocating newly available bandwidth resulting from said transmitting of said retrieved and reconstructed units of data, to said reserved requests; and deleting each request from said service and reserved lists after all of said units of data of said request have been transmitted.

7. A method of storing successive data blocks of a file on a plurality of data storage mediums, said plurality of data storage mediums comprising d data storage mediums grouped into clusters of p−1 data storage mediums, wherein said successive data blocks of the file are sequentially distributed among said plurality of data storage mediums in a round robin fashion, p−1 consecutive data blocks within a cluster forming a data group, each data group associated with a parity block computed from the data group, parity blocks associated with data groups within a particular cluster being uniformly distributed among a subset of data storage mediums, said subset of storage mediums excluding said particular cluster.

8. A method for storing at least one group according to claim 7, wherein the uniform distribution of said data and parity blocks is determined in accordance with the theory of Balanced Incomplete Block Designs.

9. A continuous media server for servicing at a particular playback rate, a request for a multimedia clip from a set of at least one stored multimedia clip comprising:

data storage memory for storing said at least one stored multimedia clip and parity data;

a storage manager for executing and managing a layout of said at least one stored multimedia clip and said parity data on said data storage memory, said layout including a substantially uniform distribution of said parity data on said data storage memory in substantial absence of a designated parity storage memory;

an admission controller for determining whether said request can be serviced; and a retriever responsive to said admission controller means for retrieving said serviceable, multimedia clip from said data storage memory.

10. A server according to claim 9 wherein said data storage memory includes at least one data storage medium, wherein p−1 data blocks of said multimedia clip and one parity block form a parity group, and wherein said layout of said at least one stored multimedia clip and parity data is a declustered distribution of said parity group on said at least one data storage medium.

11. A server according to claim 10 wherein said layout further includes an amount of reserved bandwidth for each one of said data storage mediums sufficient to retrieve p−2 data blocks and one parity block.

12. A server according to claim 11 wherein said admission controller comprises:

at least one pending list for queuing each of said requests for a multimedia clip;

at least one reserved list for each of said requests on said pending list for which bandwidth has been allocated;

a locator for identifying the data storage memory location of said allocated bandwidth for each of said requests on said reserved lists;

at least one service list identifying those requests currently being serviced; and means to continuously update said pending, reserved and service lists.

13. A server according to claim 12 further comprising means to reserve bandwidth for each of said data storage mediums having stored thereon at least one data block of said requests on said reserved lists.

14. A server according to claim 9 wherein each of said stored multimedia clips comprise a plurality of data blocks, wherein said layout includes an amount of reserved bandwidth for each one of said data storage mediums sufficient to retrieve one parity block, wherein each of said data blocks are sequentially distributed among said plurality of data storage mediums in a round robin fashion, and wherein said data blocks of said stored multimedia clips are grouped such that each group includes p−1 data blocks and one parity block, said parity blocks being uniformly distributed throughout the data storage memory.

15. A server according to claim 14 further comprising a buffer capable of storing p−1 data blocks and one parity block.

* * * * *